Figure 1:
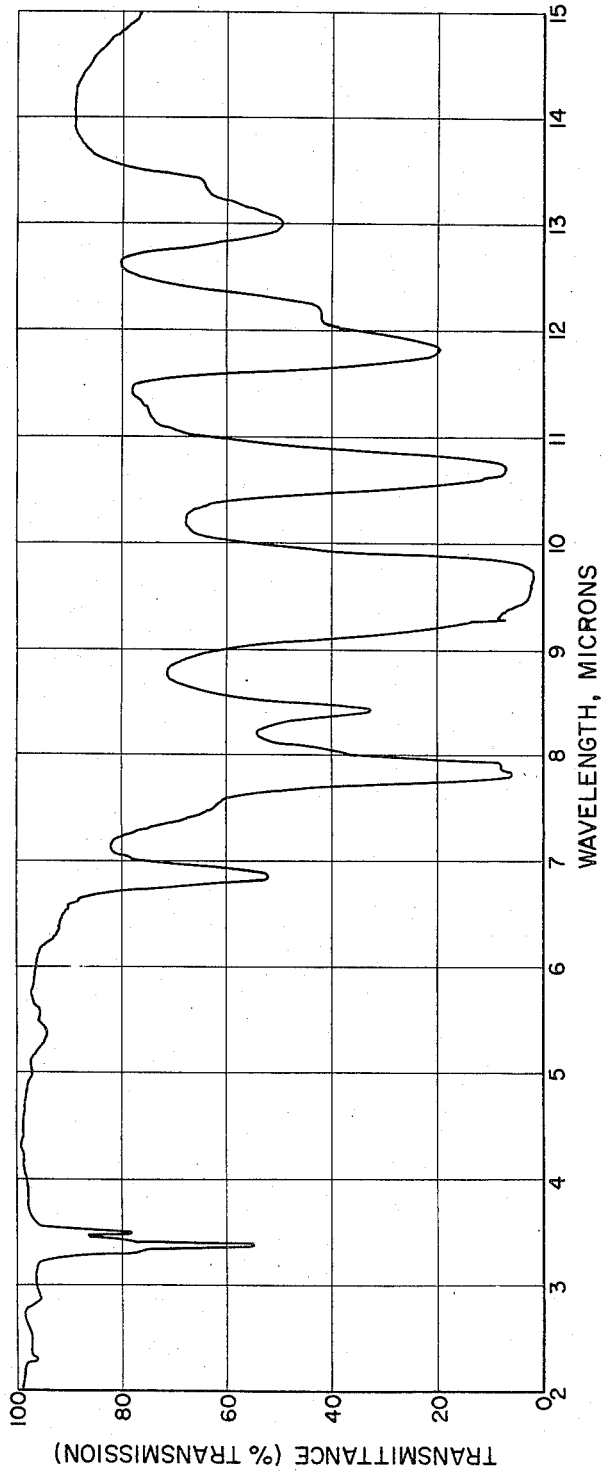

Sept. 8, 1959 E. J. KAHLER 2,903,476
ALKOXY-CONTAINING REACTION PRODUCT
Filed July 20, 1956 2 Sheets-Sheet 1

INVENTOR.
Ernest J. Kahler
BY
ATTORNEYS.

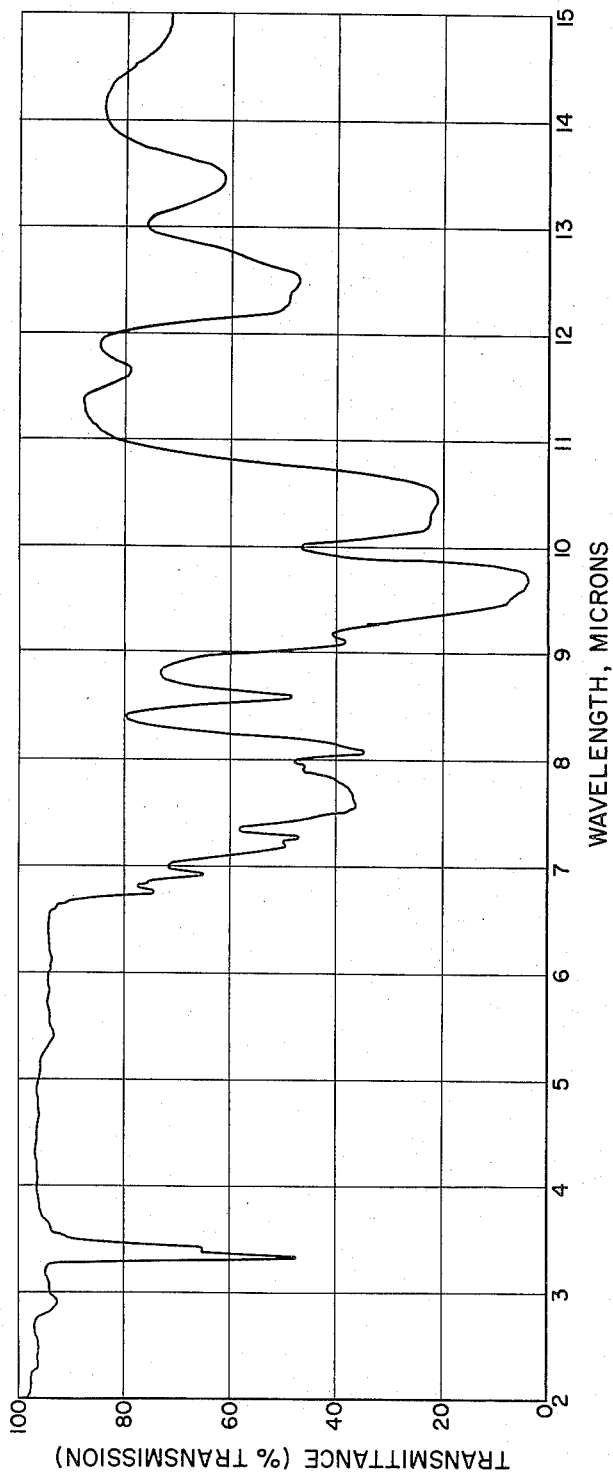

United States Patent Office

2,903,476
Patented Sept. 8, 1959

2,903,476

ALKOXY-CONTAINING REACTION PRODUCT

Ernest J. Kahler, Columbus, Ohio, assignor, by mesne assignments, to Pennsalt Chemicals Corporation, a corporation of Pennsylvania Application July 20, 1956, Serial No. 599,036

7 Claims. (Cl. 260—461)

This invention relates to the process of reacting compounds of the class $P_2X_5NO$, wherein X is halogen, with an alkali metal alcoholate and the reaction products formed thereby. The said reaction products exhibit insecticidal properties.

The starting compounds of the class $P_2X_5NO$, wherein X is halogen, are disclosed and claimed in applicant's copending application, Serial No. 565,794, filed February 16, 1956. As disclosed therein, the compound $P_2X_5NO$ may be prepared by reacting phosphorus pentahalide with a mineral acid salt of hydroxylamine. The halogen of the phosphorus pentahalide, of course, is the halogen desired in the $P_2X_5NO$. Thus, in the production of $P_2Cl_5NO$, phosphorus pentachloride is used. It is preferable to use a hydrogen halide salt of hydroxylamine because the volatile nature of the hydrogen halide permits easy separation of the hydrogen halide from the resulting reaction mixture. As also set forth in the copending application, the reaction between the phosphorus pentahalide and the hydrogen halide salt of hydroxylamine should be stopped at the cessation of evolution of chlorine gas from the reaction mixture for maximum yield of $P_2X_5NO$. The structure of $P_2X_5NO$, illustrating X as chlorine, has been determined as follows:

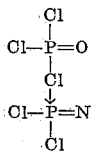

The copending application should be consulted for more detailed information as to the production of the starting compounds $P_2X_5NO$.

Briefly, applicant has discovered that compounds of the class $P_2X_5NO$, wherein X is halogen, react with alkali metal alcoholates to form the halide salt of the alkali metal and yield a major reaction product containing alkoxy groups. The reaction can conveniently be carried out at ordinary room temperature in appropriate solvents for the $P_2X_5NO$ and the alkali metal alcoholates. As disclosed in said copending application, appropriate solvents for $P_2X_5NO$ include aromatic hydrocarbons, aliphatic hydrocarbons, chlorinated hydrocarbons, and ethers. The alcoholate may be dissolved in any alkyl alcohol and conveniently the same alcohol of which the alcoholate is a derivative. The following examples are illustrative of the invention.

EXAMPLE I

A solution of fresh sodium methylate was prepared in an excess of methanol. The sodium methylate solution was cooled to about 10–15° C. and a benzene solution of $P_2Cl_5NO$ was slowly added to the mixture while stirring. The $P_2Cl_5NO$ was added in a sufficient amount to neutralize the sodium methylate. The reaction mixture was agitated at room temperature for between 0.5–1.0 hour. The reaction mixture was then filtered to remove the NaCl. The benzene-methanol solvent was removed under slight vacuum. The product was then collected by vacuum distillation at 104–120° C. at 0.3 millimeter of mercury. The collected product boiling within this range had a refractive index of $n_D^{20}$ 1.437.

EXAMPLE II

Following the same procedure as in Example I, fresh sodium methylate dissolved in excess methanol was reacted with $P_2Cl_5NO$ dissolved in benzene. After the NaCl was filtered off, the benzene-methanol solvent was removed under slight vacum. The reaction mixture was then subjected to vacuum distillation and the product boiling from 114° C. under 0.6 millimeter of mercury to 120° C. under 0.45 millimeter of mercury was collected.

EXAMPLE III

Fresh sodium methylate dissolved in excess methanol was reacted with a benzene solution of $P_2Cl_5NO$ in the same manner as the previous examples. The benzene-methanol solvent was removed under slight vacuum after the NaCl was filtered off. The reaction mixture was subjected to vacuum distillation and the product boiling from 120–123° C. under 0.65 millimeter of mercury was collected. The refractive index of this collected product was $n_D^{20}$ 1.438.

In order to neutralize the sodium methylate, slightly more than 1.0 mole of $P_2Cl_5NO$ is necessary for every 5 moles of sodium methylate. This corresponds to a reaction of 1 mole of the alcoholate reacting with each of the chlorine atoms in the compound $P_2Cl_5NO$. Infrared analyses of the products showed the presence of $CH_3O$— groups and only traces of hydroxy groups, which became less evident upon further purification of the product. A representative infrared spectrum of the alkoxy reaction product formed by the reaction of sodium methylate with $P_2Cl_5NO$ is shown in Fig. 1. Analysis of the reaction product shows that the percentage relationship between the phosphorus, nitrogen, carbon, and hydrogen content is, respectively, about 22.0 percent, 5.6 percent, 24.2 percent, and 6.0 percent. The molecular weight is determined to be approximately 244.

The same reaction as described in the above examples has also been applied to $P_2Cl_5NO$ and sodium ethylate. This reaction is described in the following examples:

EXAMPLE IV

Fresh sodium ethylate dissolved in excess ethanol was cooled to about 10–15° C. and a benzene solution of $P_2Cl_5NO$ slowly added during stirring. The $P_2Cl_5NO$ was added in an amount sufficient to neutralize the sodium ethylate. The reaction mixture was stirred at room temperature for about 0.5 to 1.0 hour. The reaction mixture was then filtered to remove the NaCl and then subjected to distillation under slight vacuum to remove the benzene-ethanol solvent. The reaction mixture was then subjected to vacuum distillation and the product boiling within the range of 134° C. under 0.5 millimeter of mercury to 140° C. under 2.1 millimeters of mercury was collected.

EXAMPLE V

A sodium ethylate solution in ethanol was treated with $P_2Cl_5NO$ in the same manner as in Example IV. After removal of the NaCl and the benzene-ethanol solvent the mixture was subjected to vacuum distillation to collect a product boiling within the range of 122° C. to 130° C. under 0.5 millimeter of mercury pressure.

As in the case of the reaction with sodium methylate, slightly more than 1.0 mole of $P_2Cl_5NO$ was necessary to neutralize 5 moles of sodium ethylate. The phosphorus, nitrogen, carbon, and hydrogen content of the reaction mixture was analyzed to be approximately 19.8 percent, 4.06 percent, 36.9 percent, and 7.7 percent, respectively. The product had a refractive index within the range of $n_D^{20}$ 1.4331 to 1.4305. Infrared analyses shows the presence of $C_2H_5O-$ groups. An infrared spectrum representative of the alkoxy reaction product of sodium ethylate with $P_2Cl_5NO$ is shown in Fig. 2.

These alkoxy reaction products have insecticidal properties, as illustrated in the following example:

EXAMPLE VI

The alkoxy reaction product of $P_2Cl_5NO$ and sodium ethylate, prepared as described in Example IV, was used as a contact spray on houseflies. A spray solution containing 12.5 milligrams of the product per milliliter of acetone was sprayed on two lots of houseflies caged in containers. The number of flies knocked down were counted at various time intervals. The kill at the end of 24 hours was compared with that obtained using a standard DDT solution of 3.125 milligrams of DDT per milliliter of acetone. Acetone alone was also run as a control check. The results obtained are shown in the summary below. The alkoxy reaction product of $P_2Cl_5NO$ and sodium ethylate is shown equal to DDT as a killing agent for houseflies.

*Summary*

| Agent | Run No. | Total Flies | Percent Knocked Down | 0.5 Hour | | 4.5 Hours | | 24 Hours | | Percent Dead | Ave. Percent Dead |
|---|---|---|---|---|---|---|---|---|---|---|---|
| | | | | Up | Down | Up | Down | Up | Down | | |
| Acetone | A | 57 | 3.5 | 55 | 2 | 57 | 0 | 55 | 2 | 4 | 5 |
| | B | 44 | 16 | 37 | 7 | 42 | 2 | 41 | 3 | 7 | |
| DDT | A | 60 | 100 | 0 | 60 | 1 | 59 | 1 | 59 | 98 | 99 |
| | B | 52 | 100 | 0 | 52 | 2 | 50 | 0 | 52 | 100 | |
| $P_2Cl_5NO-NaOC_2H_5$ reaction product | A | 53 | 100 | 0 | 53 | 0 | 53 | 0 | 53 | 100 | 100 |
| | B | 49 | 100 | 0 | 49 | 0 | 49 | 0 | 49 | 100 | |

In summary, applicant has discovered that compounds of the class $P_2X_5NO$, wherein X is halogen, may be reacted with an alkali metal salt of any alkyl alcohol. This invention represents, so far as is known, the first instance of this type of a reaction to produce an insecticidal reaction product. The product may be applied to the insect-infested area or the area desired to be protected against insects in any conventional manner, such as by spraying, coating, or other methods of applying insecticidal compositions.

While particular embodiments of this invention have been shown and described, it will be obvious to those skilled in the art that various changes and ramifications may be made without departing from the invention in its broader aspects. Therefore, the appended claims are intended to cover all such changes and modifications as fall within the true spirit and scope of the invention.

What is claimed is:

1. The process comprising treating $P_2Cl_5NO$ with an alkali metal alcoholate of a lower alcohol.

2. The process comprising treating $P_2Cl_5NO$ with an alkali metal methylate.

3. The process comprising treating $P_2Cl_5NO$ with an alkali metal ethylate.

4. The process comprising treating $P_2Cl_5NO$ with an alkali metal alcoholate of a lower alcohol whereby alkali metal chloride is formed, separating the resulting alkali metal chloride from the reaction mixture, and separating from the resulting reaction mixture a reaction product containing alkoxy groups.

5. The alkoxy product formed by the reaction of $P_2Cl_5NO$ and an alkali metal alcoholate of a lower alcohol, said product being separated from the alkali metal halide formed during said reaction.

6. The alkoxy reaction product of $P_2Cl_5NO$ and an alkali metal methylate having an infrared spectrum corresponding to the spectrum shown in Fig. 1.

7. The alkoxy reaction product of $P_2Cl_5NO$ and an alkali metal methylate having an infrared spectrum corresponding to the spectrum shown in Fig. 2.

References Cited in the file of this patent

Besson et al.: Compt. Rend. 143, 38 (1906).

Mellor: "Comprehensive Treatise on Inorganic and Theoretical Chemistry," Longmans, Green and Co., N.Y., 1928, vol. 8, p. 722.

Kosolapoff: "Organophosphorus Compounds," p. 224, John Wiley & Sons, N.Y., 1951.

Moeller: "Inorganic Chemistry," p. 633, John Wiley & Sons, N.Y. (1952).